United States Patent
Ali et al.

(10) Patent No.: US 6,798,919 B2
(45) Date of Patent: Sep. 28, 2004

(54) SYSTEM AND METHOD FOR PROVIDING A SCALABLE DYNAMIC OBJECTIVE METRIC FOR AUTOMATIC VIDEO QUALITY EVALUATION

(75) Inventors: Walid S. I. Ali, Ossinning, NY (US); Cornelis Van Zon, Peekskill, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 613 days.

(21) Appl. No.: 09/734,823

(22) Filed: Dec. 12, 2000

(65) Prior Publication Data

US 2002/0071614 A1 Jun. 13, 2002

(51) Int. Cl.[7] .............................. G06K 9/38; G06K 9/40; H04N 17/00; H04N 17/02; G01R 13/00; G01R 29/26
(52) U.S. Cl. ........................ 382/272; 382/254; 348/180; 702/69
(58) Field of Search ................................. 348/180, 184, 348/192, 438.1, 455, 193; 382/162, 254, 260, 272, 286; 702/182, 183, 66–69

(56) References Cited

U.S. PATENT DOCUMENTS

| | | | |
|---|---|---|---|
| 5,446,492 A | * 8/1995 | Wolf et al. ................. | 348/192 |
| 6,239,834 B1 | * 5/2001 | Miyaji et al. ............... | 348/193 |
| 6,285,797 B1 | * 9/2001 | Lubin et al. ................ | 382/254 |
| 6,493,023 B1 | * 12/2002 | Watson ........................ | 348/180 |
| 6,577,764 B2 | * 6/2003 | Myler et al. ................ | 382/228 |

FOREIGN PATENT DOCUMENTS

DE      19521408      12/1996

OTHER PUBLICATIONS

"Final Reprot from the Video Quality Experts Group on the Validation of Objective Models of Video Quality Assessment", Mar. 2000 XP–002201032.

* cited by examiner

Primary Examiner—Amelia M. Au
Assistant Examiner—Wesley Tucker
(74) Attorney, Agent, or Firm—Laurie E. Gathman

(57) ABSTRACT

There is disclosed an improved system and method for providing a scalable dynamic objective metric for automatically evaluating the video quality of a video image. The system comprises an objective metric controller that is capable of receiving a plurality of objective metric figures of merit from a plurality of objective metric model units. The system determines a scalable dynamic objective metric from a weighted average of the plurality of objective metric figures of merit. The scalable dynamic objective metric represents the best correlation of objective metric measurements of the video image with subjective measurements of the video image. The weight value of individual objective metric figures of merit may be increased or decreased depending upon the type of video image being evaluated. Individual objective metric figures of merit may be added to the system or deleted from the system. The system is capable of continually determining a new value of the scalable dynamic objective metric as the plurality of objective metric model units receive new video images.

18 Claims, 2 Drawing Sheets

SYSTEM AND METHOD FOR PROVIDING A SCALABLE DYNAMIC OBJECTIVE METRIC FOR AUTOMATIC VIDEO QUALITY EVALUATION

TECHNICAL FIELD OF THE INVENTION

The present invention is generally directed to systems and methods for evaluating video quality, and, in particular, to an improved system and method for providing a scalable dynamic objective metric for automatically evaluating video quality of a video image.

BACKGROUND OF THE INVENTION

Video experts continually seek new algorithms and methods for improving the quality of video images. The primary goal is to obtain the most perceptually appealing video image possible. The ultimate criterion is the question "How well does the viewer like the resulting picture?" One way to answer the question is to have a panel of viewers watch certain video sequences and then record the opinions of the viewers concerning the resulting image quality. The results, however, will vary from panel to panel according to the variability between the viewing panels. This problem is commonly encountered when relying on subjective human opinion. The severity of the problem is increased when the viewing panel is composed of non-experts.

Results solely based upon on human perception and subjective opinion are usually subjected to subsequent statistical analysis to remove ambiguities that result from the non-deterministic nature of subjective results. Linear and non-linear heuristic statistical models have been proposed to normalize these types of subjective results and obtain certain figures of merit that represent the goodness (or the degradation) of video quality. The process of measuring video quality in this manner is referred to as "subjective video quality assessment."

Subjective video quality assessment methods give valid indications of visible video artifacts. Subjective video quality assessment methods, however, are probabilistic in nature, complex, time consuming, and sometimes difficult to apply. In addition, there is a problem in selecting appropriate viewers for the viewing panel. A non-trained viewer will be a poor judge of the suitability of new video processing methods. A non-trained viewer, however, will likely accurately represent the general consumers in the marketplace. On the other hand, a trained expert viewer will be overly biased toward detecting minor defects that will never be noticed by the general consumer.

To avoid the disadvantages that attend subjective methods for evaluating video quality, it is desirable to use automated objective methods to evaluate video quality. Automated objective methods seek to obtain objective figure of merits to quantify the goodness (or the degradation) of video quality. The process for obtaining one or more objective measures of the video quality must be automated in order to be able to quickly analyze differing types of video algorithms as the video algorithms sequentially appear in a video stream.

Objective measures of video quality are fully deterministic. That is, the results will always be the same when the test is repeated (assuming the same settings are preserved).

Because the ultimate goal is to present the viewer with the most appealing picture, a final judge of the value of the objective measures of video quality is the degree of correlation that the objective measures have with the subjective results. Statistical analysis is usually used to correlate the results objectively obtained (automatically generated) with the results subjectively obtained (from human opinion).

There is a need in the art for improved systems and methods for automatically measuring video quality. The process of automatically measuring video quality is referred to as "objective video quality assessment."

Several different types of algorithms have been proposed that are capable of providing objective video quality assessment. The algorithms are generally referred to as "objective video quality models." A report from the Video Quality Experts Group (VQEG) sets forth and describes the results of an evaluation performed on ten (10) objective video quality models. The report is dated December 1999 and is entitled "Final Report from the Video Quality Experts Group on the validation of Objective Models of Video Quality Assessment."

Each different objective video quality model provides its own distinctive measurement of video quality referred to as an "objective metric." A "double ended" objective metric is one that evaluates video quality using a first original video image and a second processed video image. A "double ended" objective metric compares the first original video image to the second processed video image to evaluate video quality by determining changes in the original video image. A "single ended" objective metric is one that evaluates video quality without referring to the original video image. A "single ended" objective metric" applies an algorithm to a video image to evaluate its quality.

No single objective metric has been found to be superior to all the other objective metrics under all conditions and for all video artifacts. Each objective metric has its own advantages and disadvantages. Objective metrics differ widely in performance (i.e., how well their results correlate with subjective quality assessment results), and in stability (i.e., how well they handle different types of video artifacts), and in complexity (i.e., how much computation power is needed to perform the algorithm calculations).

A wide range of applications exist to which objective metrics may be applied. For example, fast real-time objective metrics are needed to judge the quality of a broadcast video signal. On the other hand, more complex and reliable objective metrics are better for judging the quality of non-real time video simulations.

Using only one objective metric (and one objective video quality model) limits the evaluation of the quality of a video signal to the level of evaluation that is obtainable from the objective metric that is used. There is a need in the art for an improved system and method that uses more than one objective metric for video quality evaluation.

SUMMARY OF THE INVENTION

The present invention generally comprises an improved system and method for providing a scalable dynamic objective metric for automatically evaluating video quality of a video image.

In an advantageous embodiment of the present invention, the improved system of the invention comprises an objective metric controller that is capable of receiving a plurality of objective metric figures of merit from a plurality of objective metric model units. The objective metric controller is capable of determining a scalable dynamic objective metric from the plurality of objective figures of merit.

In an advantageous embodiment of the present invention, the improved method of the invention comprises the steps of 1) receiving in an objective metric controller a plurality of objective metric figures of merit from a plurality of objective metric model units, and 2) determining a scalable dynamic objective metric from the plurality of said objective metric figures of merit.

It is a primary object of the present invention to provide an improved system and method for providing a scalable dynamic objective metric for automatically evaluating video quality of a video image.

It is another object of the present invention to provide a scalable dynamic objective metric by obtaining a weighted average of a plurality of objective metric figures of merit.

It is an additional object of the present invention to provide a scalable dynamic objective metric by obtaining a weighted average of a plurality of objective metric figures of merit using a correlation factor that represents how well an objective metric figure of merit evaluates video image characteristics.

It is another object of the present invention to continually determine new values of the scalable dynamic objective metric from new values of the plurality of objective metric figures of merit as new video images are continually received.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
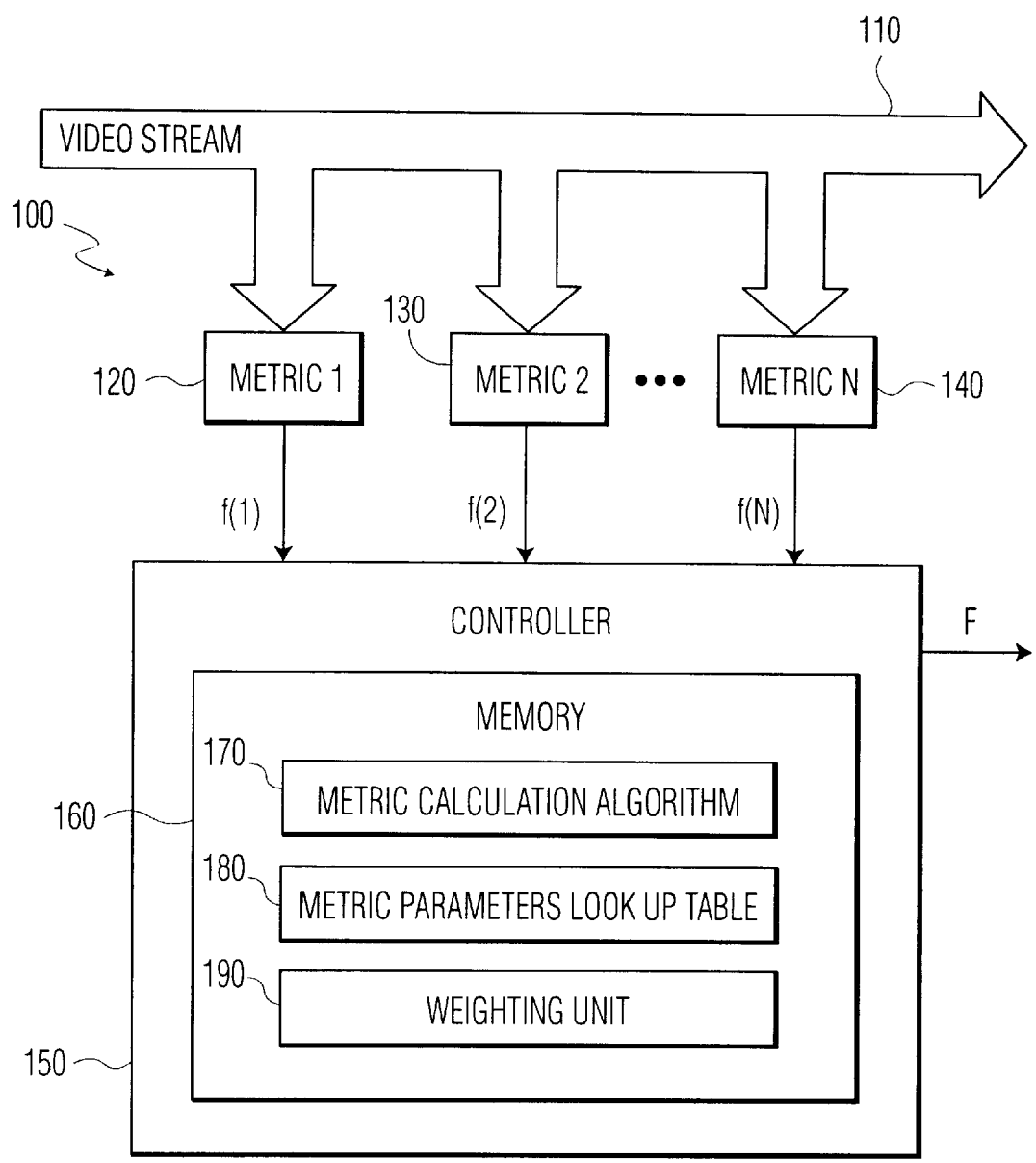
FIG. 1 is a block diagram that illustrates 1) a plurality of objective metric model units for obtaining a plurality of objective metric figures of merit from a video stream and 2) a objective metric controller capable of using the plurality of objective metric figures of merit to determine a scalable dynamic objective metric.
Figure 2:
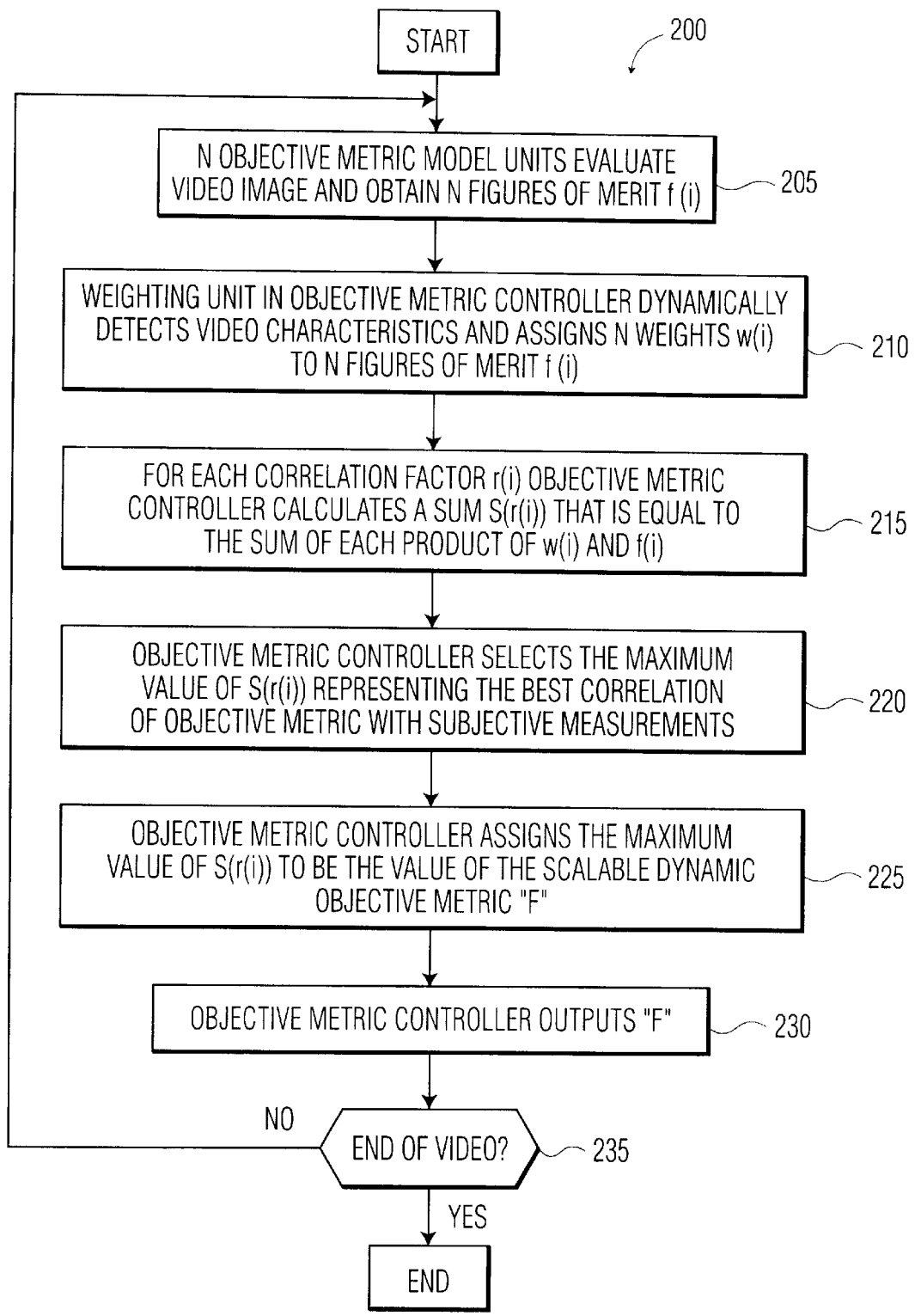
FIG. 2 is a flow chart diagram illustrating an advantageous method of operation of the improved system of the present invention.

FIGS. 1 and 2, discussed below, and the various embodiments set forth in this patent document to describe the principles of the improved system and method of the present invention are by way of illustration only and should not be construed in any way to limit the scope of the invention. Those skilled in the art will readily understand that the principles of the present invention may also be successfully applied in any type of device for evaluating video quality.

FIG. 1 illustrates system 100 for providing a scalable dynamic objective metric for automatic video quality evaluation. System 100 receives video stream 110. Each of a plurality of objective metric model units (120, 130, . . . , 140) receives a copy of the video signal of video stream 110. Objective metric model unit 120 applies a first objective metric model (referred to as "Metric 1") to obtain a first figure of merit, f(1), that represents the quality of the video signal based on the first objective metric model. The first figure of merit, f(1), is provided to controller 150.

Similarly, objective metric model unit 130 applies a second objective metric model (referred to as "Metric 2") to obtain a second figure of merit, f(2), that represents the quality of the video signal based on the second objective metric model. The second figure of merit, f(2), is also provided to controller 150. Continuing in this manner, other objective metric model units are added until the last objective metric model unit 140 has been added. Objective metric model unit 140 applies the last objective metric model (referred to as "Metric N"). Objective metric model units (120, 130, . . . , 140) obtain a plurality of figures of merit (f(1), f(2), . . . , f(N)) and provide them to controller 150.

The figures of merit (f(1), f(2), . . . , f(N)) represent a series of N evaluations of the quality of the video stream by N different objective metrics. The figures of merit (f(1), f(2), . . . , f(N)) may also be designated f(i) where the value of i goes from 1 to N.

As will be explained below in greater detail, system 100 of the present invention provides a system and method for using the figures of merit f(i) to calculate a scalable dynamic objective metric. The letter "F" (shown in FIG. 1) designates the scalable dynamic objective metric of the present invention.

System 100 of the present invention comprises controller 150 and memory 160. Controller 150 comprises a conventional microprocessor chip. Controller 150 is coupled to a plurality of objective metric model units (120, 130, . . . , 140) via signal communication lines (shown in FIG. 1). Controller 150 operates in conjunction with an operating system (not shown) located within memory 160 to process data, to store data, to retrieve data and to output data. Controller 150 calculates scalable dynamic objective metric "F" by executing computer instructions stored in memory 160.

Memory 160 may comprise random access memory (RAM), read only memory (ROM), or a combination of random access memory (RAM) and read only memory (ROM). In an advantageous embodiment of the present invention, memory 160 may comprise a non-volatile random access memory (RAM), such as flash memory. Memory 160 may also comprise a mass storage data device, such as a hard disk drive (not shown in FIG. 1) or a compact disk read only memory (CD-ROM) (not shown in FIG. 1).

It is noted that the system and method of the present invention may be used in a wide variety of types of video processing systems, including, without limitation, hard disk drive based television sets and hard disk drive based video recorders, such as a ReplayTV™ video recorder or a TiVO™ video recorder.

Controller 150 and metric calculation algorithm 170 together comprise an objective metric controller that is capable of carrying out the present invention. Under the direction of computer instructions in metric calculation algorithm 170 stored within memory 160, controller 150 calculates a scalable dynamic objective metric "F" using the figures of merit f(i).

A weighting unit 190 within controller 150 dynamically detects the currently occurring characteristics of the video sequence. The currently occurring characteristics may include such features as sharpness, color, saturation, motion, and similar types of features. Weighting unit 190 assigns a value (or "weight") w(i) to each objective metric (Metric 1, Metric 2, . . . , Metric N). For example, if Metric 1 is especially good when used on a certain first type of video signal, then the value of w(1) is given a greater value than the other values of w(i). Conversely, if Metric 2 is not very good when used on that same first type of video signal, then w(2) will be given a lower value than the other values of w(i). If a second type of video signal is present, it may be that Metric 1 is not as good as Metric 2 when used on the second type of video signal. In that case, w(2) is given a higher value and w(1) is given a lower value than the other values of w(i).

Generally speaking, the values of w(i) that weighting unit 190 selects will vary depending upon the type of video signal that weighing unit 190 dynamically detects. Controller 150 uses metric calculation algorithm 170 to calculate the sum S of the products of each w(i) and f(i). That is, $$S = w(1)f(1) + w(2)f(2) + \ldots + w(N)f(N) \quad (1)$$

or $$S = \Sigma w(i)f(i) \quad (2)$$

where the value of i runs from 1 to N.

A correlation factor r(i) is associated with each figure of merit f(i). The correlation factor r(i) is obtained from the expression:

$$r(i) = 1 - [A(i)/B] \quad (3)$$

where $$A(i) = 6\Sigma[(X(i,j) - Y(i,j)]^2 \quad (4)$$

where the value of j runs from 1 to n.
and where $$B = n(n^2 - 1) \quad (5)$$

The values of X(i,j) are the values of a set of n objective data values for a video image. The values of Y(i,j) are the values of a set of n subjective data values for the same video image. That is, the number of X data points (n) is the same number of Y data points (n).

The value r(i) is referred to as the "Spearman rank" correlation factor. The value r(i) is a measure of how well the objective X values match the subjective Y values. The values of the correlations factors r(i) for each figure of merit f(i) are known, having been previously determined by statistical analysis. Values of the correlation factors r(i) are stored in metric parameters look up table 180 in memory 150.

A "best fitting" value for scalable dynamic objective metric "F" is desired. The "best fitting" value of "F" represents the highest level of correlation of the objective metric measurements of video quality (generated automatically) and the subjective measurements of video quality (from human opinions). The "best fitting" value of "F" represents the closest approximation of the subjective measurements of video quality by the objective measurements of video quality. Because the video images in a video stream are constantly changing, the "best fit" will require constant automatic updating. The term "dynamic" refers to the ability of the objective metric of the present invention to continually change its value to take into account the continual changes of the video images in a video stream.

As previously mentioned, weighting unit 190 continually (i.e., dynamically) detects the characteristics of the video sequence as they occur. For each correlation factor r(i), weighting unit 190 continually assigns values of w(i) to each figure of merit f(i). To dynamically obtain the "best fitting" value of "F", metric calculation algorithm 170 determines the values of w(i) that cause the value S to be a maximum for each value of r(i). The largest of these values (i.e., the maximum value) is selected to be the scalable dynamic objective metric "F." That is, $$F = \text{Maximum}[S(r(1)), S(r(2)), \ldots, S(r(N))] \quad (6)$$

Scalable dynamic objective metric "F" is referred to as "scalable" because new objective metric model units can be easily added (as long as their correlation factors r(i) are defined). In addition, objective metric model units that are no longer desired can easily be removed.

The scalable dynamic objective metric "F" of the present invention provides a great deal of flexibility. For example, for fast (real time) video signals, any complicated measurement objective metrics may be switched off so that their figures of merit are not considered in the metric calculation process. For simulation and video chain optimization applications, where more time can be used to perform the metric calculation, the more complicated measurement objective metrics may be switched on so that their figures of merit may be considered in the metric calculation process.

The scalable dynamic objective metric of the present invention avoids the shortcomings of any single objective metric. This is because weighting unit 190 will assign a low value to w(i) for any objective metric that performs poorly in the presence of a certain set of artifacts. The scalable dynamic objective metric of the present invention achieves the highest correlation with the results of subjective testing when compared any single objective metric. The scalable dynamic objective metric of the present invention will be at least as good as the best single objective metric under all circumstances. Because the scalable dynamic objective metric permits the inclusion of any objective metric, the system and method of the present invention is not limited to use with a particular type of objective metric (e.g., a "single ended" objective metric or a "double ended" objective metric).

It is noted that the elements of the present invention that have been implemented in software (e.g., weighting unit 190) may be implemented in hardware if so desired.

FIG. 2 is a flow chart diagram illustrating the method of operation of the system of the present invention. The steps of the method are generally denoted with reference numeral 200. A video image from video stream 110 is provided to N objective metric model units (120, 130, . . . , 140). The N objective metric model units (120, 130, . . . , 140) evaluate the video image and obtain N respective figures of merit, f(i) (step 205).

Weighting unit 190 in objective metric controller 150 then dynamically detects video characteristics of the video image and assigns N weights, w(i), to the N figures of merit, f(i) (step 210). For each correlation factor, r(i), objective metric controller 150 calculates a sum, S(r(i)), that is equal to the sum of each product of weight, w(i), and figure of merit, f(i) (step 215).

Objective metric controller 150 then selects the maximum value of the sum, S(r(i)), that corresponds to the best correlation of objective measurements of video quality with subjective measurements of video quality (step 220). Objective metric controller 150 then assigns that value to be the value of the scalable dynamic objective metric "F" (step 225). Objective metric controller 150 then outputs that value of "F" (step 230).

After the value of "F" has been output, a determination is made whether objective metric controller 150 is still receiving video images (decision step 235). If the video has ended, then the process ends. If the video has not ended and more video images are being received, control passes back to step 205 and the objective controller 150 continues to operate in the manner that has been described.

The present invention has been described as a system for providing a scalable dynamic objective metric for evaluating video quality of a video image. It is understood that the "scalable dynamic objective metric" of the present invention is a general case that includes as a subset the more specific case of providing a "static objective metric." To provide a "static objective metric" the present invention 1) receives a plurality of objective metric figures of merit from a plurality of objective metric model units, and 2) determines a weight value, w(i), for each of the plurality of objective metric figures of merit, and 3) thereafter keeps the weight values, w(i), constant (i.e., unchanged) during the process of calculating objective metric "F" for video stream 110.

Although the present invention has been described in detail, those skilled in the art should understand that they can make various changes, substitutions and alterations herein without departing from the spirit and scope of the invention in its broadest form.

What is claimed is:

1. A system for providing a scalable dynamic objective metric for evaluating video quality of a video image, said system comprising:

an objective metric controller capable of receiving a plurality of objective metric figures of merit from a plurality of objective metric model units, said objective metric controller comprising a weighting unit dial is capable of assigning a weight value to each of said plurality of objective metric figures of merit by using a correlation factor r(i), for each of said objective metric figures of merit, where each correlation factor r(i) for an objective metric figure of merit represents how well the objective metric figure of merit evaluates video image characteristics;

wherein said objective metric controller is capable of calculating a plurality of sums where each sum, S(r(i)), is equal to the sum of each product of weight value, w(i) and figure of merit f(i), for each of said correlation factors, r(i); and wherein said objective metric controller is capable of determining said scalable dynamic objective metric from said plurality of objective metric figures of merit using said sums.

2. The system for providing a scalable dynamic objective metric for evaluating video quality of a video image as claimed in claim 1 wherein the number of said plurality of objective metric figures of merit may vary from two to N, where N is an integer number.

3. The system for providing a scalable dynamic objective metric for evaluating video quality of a video image as claimed in claim 1 wherein said objective metric controller is capable of determining said scalable dynamic objective metric from a weighted average of said plurality of objective metric figures of merit.

4. The system for providing a scalable dynamic objective metric for evaluating video quality of a video image as claimed in claim 1 wherein said correlation factor, r(i), is given by:

$$r(i)=1-[A(i)/B]$$

where $$A(i)=6\Sigma[(X(i,j)-Y(i,j)]^2$$

where the value of j runs from 1 to n
and where $$B=n(n^2-1)$$

where the values X(i,j) are the values of a set of n objective data values for a video image and the values Y(i,j) are the values of a set of n subjective data values for the same video image.

5. The system for providing a scalable dynamic objective metric for evaluating video quality of a video image as claimed in claim 1 wherein said weighting unit obtains each of said correlation factors, r(i), from a metric parameter look up table coupled to said objective metric controller, wherein said look up table contains previously recorded values of said correlation factors, r(i).

6. The system for providing a scalable dynamic objective metric for evaluating video quality of a video image as claimed in claim 1 wherein said objective metric controller is capable of obtaining said scalable dynamic objective metric by selecting said scalable dynamic objective metric to be the maximum value of the plurality of sums, S(r(i)), where said maximum value represents the best correlation of objective metric measurements of said video image with subjective measurements of said video image.

7. The system for providing a scalable dynamic objective metric for evaluating video quality of a video image as claimed in claim 1 wherein said objective metric controller is capable of continually determining a new value of said scalable objective metric from new values of said plurality of objective figures of merit as said plurality of objective metric model units continually receive new video images.

8. The system for providing a scalable dynamic objective metric for evaluating video quality of a video image as claimed in claim 1 wherein said objective metric controller is capable of adding at least one objective metric to said plurality of objective figures of merit, and wherein said objective metric controller is capable of deleting at least one objective metric from said plurality of objective figures of merit.

9. The system for providing a scalable dynamic objective metric for evaluating video quality of a video image as claimed in claim 1 wherein said objective metric controller comprises:

a controller capable of receiving a plurality of objective metric figures of merit, f(i), from a plurality of objective metric model units; and a metric calculation algorithm contained within a memory coupled to said controller, said metric calculation algorithm containing instructions capable of being executed by said controller to determine a value, F, for said scalable dynamic objective metric from a weighted average of said plurality of objective metric figures of merit, f(i).

10. The system for providing a scalable dynamic objective metric for evaluating video quality of a video image as claimed in claim 9 wherein said metric calculation algorithm contains instructions capable of being executed by said controller to determine said value, F, for said scalable dynamic objective metric according to the formula:

$$F = \text{Maximum}[S(r(1)), S(r(2)), \ldots, S(r(N))]$$

where the values of S(r(i)) that correspond to each correlation factor, r(i), are determined according to the formula:

$$S = \Sigma w(i) f(i)$$

where the value of i runs from 1 to N, and where f(i) represents objective metric figures of merit, and w(i) represents weight values assigned to said objective metric figures of merit, f(i).

11. The system for providing a scalable dynamic objective metric for evaluating video quality of a video image as claimed in claim 1 comprising:

a plurality of objective metric model units;

an objective metric controller capable of receiving a plurality of objective metric figures of merit from said plurality of objective metric model units, and capable of determining a value, F, for said scalable dynamic objective metric from a weighted average of said plurality of objective metric figures of merit, f(i), wherein said value F represents an objective metric that represents a maximum level of correlation of objective metric measurements of video quality and subjective measurements of video quality.

12. A system for providing a static objective metric for evaluating video quality of a video image, said system comprising:

an objective metric controller capable of receiving a plurality of objective metric figures of merit from a plurality of objective metric model units, said objective metric controller comprising a weighting unit that is capable of assigning a weight value to each of said plurality of objective metric figures of merit by using a correlation factor r(i), for each of said objective metric figures of merit, where each correlation factor r(i), for an objective metric figure of merit represents how well the objective metric figure of merit evaluates video image characteristics;

wherein said objective metric controller is capable of calculating a plurality of sums where each sum, S(r(i)), is equal to the sum of each product of weight value, w(i), and figure of merit f(i), for each of said correlation factors, r(i); and wherein said objective metric controller is capable of determining said static objective metric from said plurality of objective metric figures of merit using said sums.

13. A method for providing a scalable dynamic objective metric for evaluating video quality of a video image comprising the steps of:

receiving in an objective metric controller a plurality of objective metric figures of merit from a plurality of objective metric model units;

obtaining a correlation factor, r(i), for each of said plurality of objective metric figures of merit that represents how well an affective metric figure of merit evaluates video image characteristics;

assigning a weight value to each of said plurality of said objective metric figures of merit using said correlation factor, r(i);

calculating a plurality of sums where each sum, S(r(i)), is equal to the sum of each product of weight value w(i), and figure of merit f(i) for each of said correlation factors r(i); and determining said scalable dynamic objective metric from said plurality of said objective metric figures of merit using said sums.

14. The method for providing a scalable dynamic objective metric for evaluating video quality of a video image as claimed in claim 13 wherein the step of determining said scalable dynamic objective metric from said plurality of said objective metric figures of merit comprises the step of:

determining said scalable dynamic objective metric from a weighted average of said plurality of said objective metric figures of merit.

15. The method for providing a scalable dynamic objective metric for evaluating video quality of a video image as claimed in claim 14 further comprising the step of:

selecting said scalable dynamic objective metric to be the maximum value of the plurality of sums, S(r(i)), where said maximum value represents the best correlation of objective metric measurements of said video image with subjective measurements of said video image.

16. The method for providing a scalable dynamic objective metric for evaluating video quality of a video image as claimed in claim 14 further comprising the steps of:

assigning a low weight value to an objective metric that produces an undesirable objective metric figure of merit; and assigning a high weight value to an objective metric that produces an desirable objective metric figure of merit.

17. The method for providing a scalable dynamic objective metric for evaluating video quality of a video image as claimed in claim 13 further comprising the steps of:

receiving in said objective metric controller new values of said plurality of objective metric figures of merit from said plurality of objective metric model units as said plurality of objective metric model units receive new video images; and continually determining a new value of said scalable dynamic objective metric from said new values of said plurality of objective metric figures of merit.

18. A method for providing a static objective metric for evaluating video quality of a video image comprising the steps of:

receiving in an objective metric controller a plurality of objective metric figures of merit from a plurality of objective metric model units;

obtaining a correlation factor, r(i), for each of said plurality of objective metric figures of merit that represents how well an objective metric figure of merit evaluates video image characteristics;

determining a weight value, w(i), for each of said plurality of objective metric figures of merit;

keeping said weight values constant;

calculating a plurality of sums where each sum, S(r(i)), is equal to the sum of each product of weight value, w(i), and figure of merit, f(i), for each of said correlation factors, r(i); and calculating said static objective metric using said constant weight values and said sums.

* * * * *